(12) United States Patent
Filson et al.

(10) Patent No.: US 8,456,330 B2
(45) Date of Patent: Jun. 4, 2013

(54) CONFIGURABLE BUTTONS FOR ELECTRONIC DEVICES

(75) Inventors: John Benjamin Filson, San Jose, CA (US); Stephen Brian Lynch, Portola Valley, CA (US); Emery Sanford, San Francisco, CA (US); Jan Moolsintong, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1097 days.

(21) Appl. No.: 12/239,652

(22) Filed: Sep. 26, 2008

(65) Prior Publication Data

US 2010/0079309 A1 Apr. 1, 2010

(51) Int. Cl.
*H03M 11/00* (2006.01)

(52) U.S. Cl.
USPC .................................. 341/33; 341/20; 341/34

(58) Field of Classification Search
None
See application file for complete search history.

(56) References Cited

U.S. PATENT DOCUMENTS

| | | | |
|---|---|---|---|
| 3,772,684 A * | 11/1973 | Scantlin | 341/32 |
| 4,366,355 A * | 12/1982 | Oelsch | 200/517 |
| 7,166,791 B2 | 1/2007 | Robbin et al. | |
| 7,312,785 B2 | 12/2007 | Tsuk et al. | |
| 7,345,671 B2 | 3/2008 | Robbin et al. | |
| 7,348,967 B2 | 3/2008 | Zadesky et al. | |
| 2003/0006892 A1 * | 1/2003 | Church | 340/439 |
| 2007/0200735 A1 * | 8/2007 | Stilley et al. | 341/22 |
| 2008/0251364 A1 * | 10/2008 | Takala et al. | 200/341 |
| 2008/0280657 A1 * | 11/2008 | Maenpaa et al. | 455/575.1 |
| 2009/0107737 A1 * | 4/2009 | Reynolds et al. | 178/18.06 |
| 2009/0133510 A1 * | 5/2009 | Witte et al. | 73/862.626 |

* cited by examiner

*Primary Examiner* — Rexford Barnie
*Assistant Examiner* — Dru Parries
(74) *Attorney, Agent, or Firm* — Dorsey & Whitney LLP

(57) ABSTRACT

Configurable buttons for electronic devices such as portable electronic devices are provided. A configurable button may have a button member that moves relative to a device housing when it is desired to activate a switch. The button may have an associated touch sensor. The touch sensor may detect when a user's finger touches a particular portion of the button member. Contact with only this portion of the button member is generally inadvertent, so an actuator may be used to prevent or otherwise restrict motion of the button relative to a device housing. This prevents inadvertent activation of the button when a user is manipulating portions of an electronic device such as clip or lid, but does not intend to depress the button.

12 Claims, 14 Drawing Sheets

CONFIGURABLE BUTTONS FOR ELECTRONIC DEVICES

BACKGROUND

This invention relates generally to electronic devices, and more particularly, to buttons whose behavior may be modified in real time based on sensor readings.

Electronic devices often contain input-output devices such as buttons. The buttons may be, for example, keys in a keypad or keyboard, power buttons, menu buttons, or dedicated or multipurpose buttons that serve other functions on an electronic device.

Electronic devices such as portable electronic devices are becoming increasingly popular. Examples of portable electronic devices include handheld computers, cellular telephones, media players, and hybrid devices that include the functionality of multiple devices of this type. Popular portable electronic devices that are somewhat larger than traditional handheld electronic devices include laptop computers and tablet computers.

Electronic devices that contain buttons are often manipulated by a user. For example, a user of a device may press against the device with a finger or other object when interacting with movable structures that make up the device.

In situations such as these, it might be desirable to be able to reconfigure a button on the device in real time to avoid unintentional operation of the button. It might also be desirable to be able to make other real time adjustments to the way in which a button operates.

SUMMARY

In accordance with embodiments of the present invention, configurable buttons for electronic devices are provided. Electronic devices that use the configurable buttons may include, for example, portable electronic devices such as wearable media players.

A user often desires to physically manipulate a portion of an electronic device without activating buttons on the device. For example, a user of a small portable media player that has a clip might desire to squeeze the clip to attach the media player device to an article of clothing.

In situations such as these, the user's finger may inadvertently touch a portion of a button. A touch sensor that is associated with the button may determine when a user is attempting to physically manipulate a clip, lid, cover, or other portion of an electronic device without intending to operate the button. When this condition is detected, control circuitry within the electronic device can direct an actuator to momentarily restrict motion of the button relative to the device. This temporary restriction of the button's movement helps to avoid situations in which a button is inadvertently depressed even though a user only intended to open a clip or otherwise physically manipulate a portion of an electronic device and did not intend to operate the button.

Further features of the invention, its nature and various advantages will be more apparent from the accompanying drawings and the following detailed description of the preferred embodiments.

DETAILED DESCRIPTION

The present invention relates to configurable buttons for electronic devices.

The buttons may be keys in a keypad or keyboard, dedicated buttons such as power on-off buttons, sleep buttons, menu buttons, or volume buttons, or may be multipurpose buttons such as buttons that perform one function when pressed once and another function when pressed twice or that perform different functions depending on context. With one suitable arrangement, a user may press the button when it is desired to make selections such as selections of media playback functions in a media player (e.g., selections of which songs to play, whether to play or pause a particular track, etc.). This is, however, merely illustrative. The configurable buttons of the present invention may be used to control any suitable functions in an electronic device if desired.

The electronic devices may include any suitable equipment that uses one or more configurable buttons. For example, configurable buttons may be used in electronic accessories and peripherals such as headsets, keyboards, computer mice, remote controls, speaker systems, monitors, printers, etc. Configurable buttons may also be used in audio-visual equipment, computers, appliances, and other stand-alone equipment. Portable equipment that may include configurable buttons includes, for example, portable electronic devices such as laptop computers or small portable computers of the type that are sometimes referred to as ultraportables. Configurable buttons may also be used in somewhat smaller portable electronic devices. Examples of smaller portable electronic devices that may include configurable buttons include wristwatch devices, pendant devices, headphone and earpiece devices, and other wearable and miniature devices. If desired, electronic devices with configurable buttons such as portable electronic devices may be wireless electronic devices.

Electronic devices with configurable buttons may include, for example, handheld devices such as cellular telephones, media players, media players with wireless communications capabilities, handheld computers (also sometimes called personal digital assistants), remote controllers, global positioning system (GPS) devices, and handheld gaming devices. Electronic devices with configurable buttons may also include hybrid devices that combine the functionality of multiple conventional devices. Examples of hybrid portable electronic devices include a media player with wireless communications capabilities, a cellular telephone that includes media player functionality, a media player with gaming functionality, a gaming device that includes a wireless communications capability, a cellular telephone that includes game and email functions, a portable device that receives email, supports mobile telephone calls, has music player functionality and supports web browsing. These are merely illustrative examples.

Figure 1:
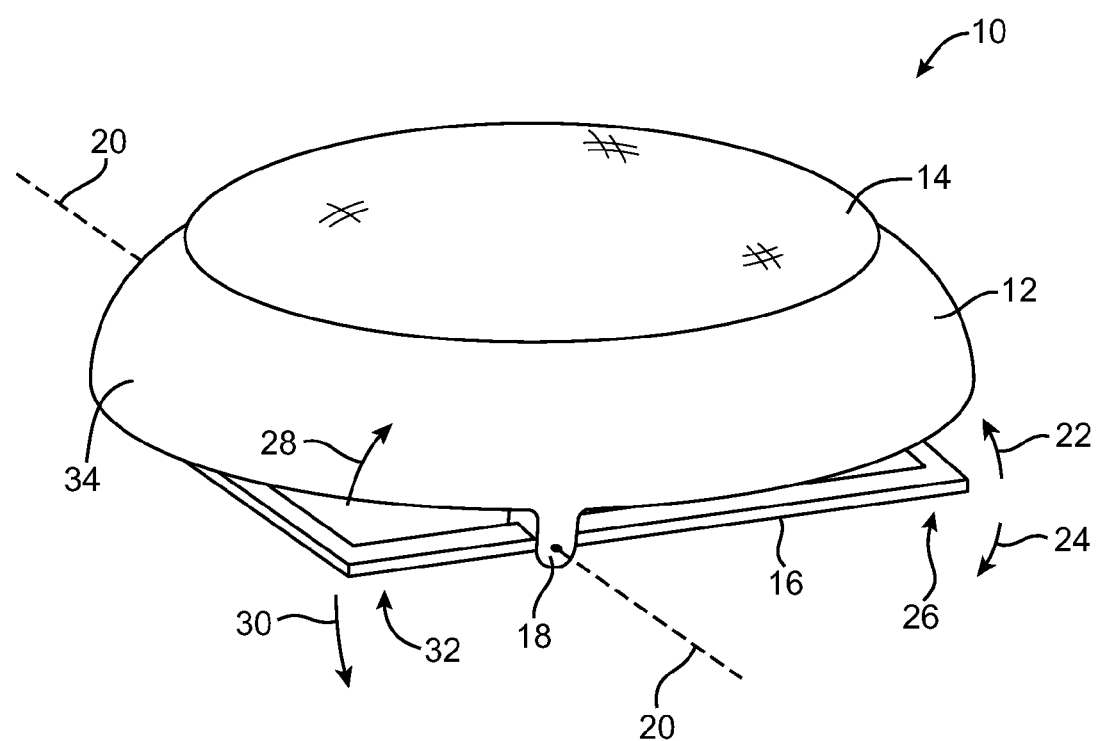
FIG. 1 is a perspective view of an illustrative portable electronic device with a configurable button in accordance with an embodiment of the present invention.

An illustrative portable electronic device in accordance with an embodiment of the present invention is shown in FIG. 1. Device 10 of FIG. 1 may be, for example, a media player. If desired, device 10 may include wireless communications functions. Optional wireless communications circuitry in device 10 may, for example, be used to support communications with wireless Bluetooth® headphones or WiFi® (IEEE 802.11) local area network equipment.

As shown in FIG. 1, device 10 may include one or more buttons such as button 14. In the FIG. 1 example, there is a single button 14 mounted within device housing 12. This is merely illustrative. Device 10 may include any suitable number of buttons (e.g., two buttons, three buttons, more than three buttons, etc.). One, some, or all of such buttons may be configurable.

Housing 12, which is sometimes referred to as a case, may be formed of any suitable materials including, plastic, glass, ceramics, metal, other suitable materials, or a combination of these materials. In some situations, housing 12 or portions of housing 12 may be formed from a dielectric or other low-conductivity material, so as not to disrupt the operation of conductive antenna elements that are located in proximity to housing 12. An advantage of forming housing 12 from a dielectric material such as plastic is that this may help to reduce the overall weight of device 10 and may avoid potential interference with wireless operations. An advantage of forming housing 12 from materials such metal is that metal may be durable and may provide an attractive finish. In scenarios in which housing 12 is formed from metal elements, one or more of the metal elements may be used as part of the antennas in device 10. For example, metal portions of housing 12 may be shorted to an internal ground plane in device 10 to create a larger ground plane element for that device 10.

When a button is configurable, its properties may be altered in real time (e.g., based on sensor input). If, for example, the presence of a user's finger is detected, the amount of travel that is permitted for all or part of the button may be restricted. Solenoids and other actuators may be used to alter the allowed range of motion and other mechanical properties of a configurable button. Restriction of a button's range of motion in certain circumstances may help to prevent unintended operation of button 14. For example, a user who is manipulating a part of device 10 may necessarily risk operating button 14, even when button operation is not intended. Selective restriction of the button's motion may help to reduce this risk.

Consider, as an example, the illustrative situation of FIG. 1 in which device 10 is provided with a mechanical structure such as clip 16. A user may open and close clip 16 when it is desired to fasten device 10 to a user's clothing. As shown in FIG. 1, clip 16 may be mounted to device 10 using a hinge structure such as hinge structure 18. Hinge structure 18 may support clip 16 for rotational motion about rotational axis 20. When supported in this way, end 26 of clip 16 may move in direction 24 when end 32 of clip 16 moves in direction 28, whereas end 26 of clip 16 may move in direction 22 when end 32 of clip 16 moves in direction 30. Hinge structure 18 may include a spring that biases end 26 of clip in direction 22 against the lower surface of housing 12 when a user is not pressing on end 32. When a user desires to open clip 16, the user may press on end 32 of clip 16 to press end 32 upwards in direction 28. This causes end 26 of clip 16 to open, so that device 10 may be attached to a suitable object such as the user's clothing.

In a typical scenario, a user may press clip 16 upwards in direction 28 by squeezing end 32 of clip 16 and end 34 of device 10 between two opposing fingers. While convenient for a user, this type of squeezing operation may inadvertently cause a portion of one of the user's fingers to contact a portion of button 14. A conventional button on a device of this type might therefore be accidentally depressed, even in situations in which the user only intended to open a clip and did not intend to operate the device.

Figure 2:
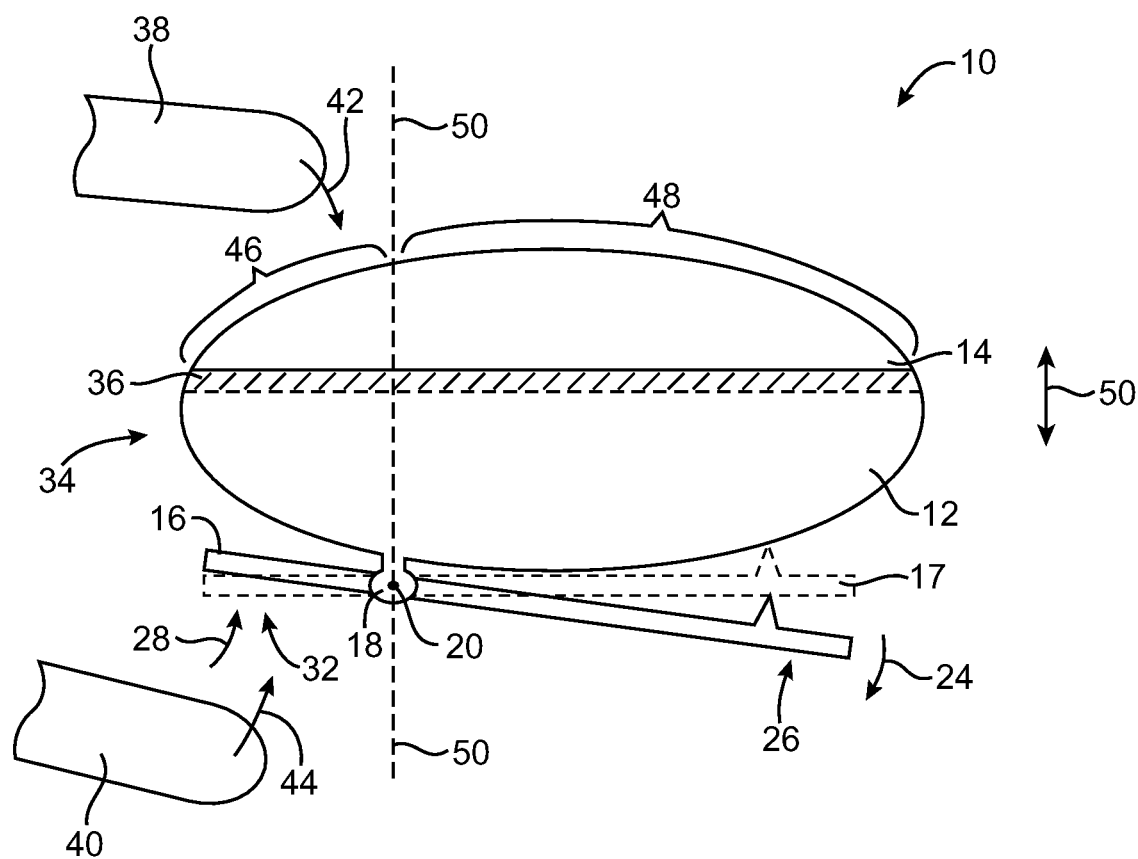
FIG. 2 is a side view of an illustrative portable electronic device with a configurable button of the type shown in FIG. 1 in accordance with an embodiment of the present invention.

Configurable buttons in accordance with the present invention can be configured in real time to prevent unintended activation by a user. As shown in FIG. 2, device 10 may contain a sensor such as sensor 36. Sensor 36 may be, for example, a capacitive touch sensor. Sensors readings from sensor 36 may be used to control the operation of button 14 in real time.

When a user desires to open clip 16, a user may squeeze end 34 of device 10 between opposing fingers such as fingers 40 and 38. In general, device 10 and its button 14 and other structures may be manipulated using any suitable animate or inanimate members. For example, these structures may be manipulated by a user's fingers or other body parts, by a stylus or other pointer, or using any other suitable external source of force. For clarity, the present invention is sometimes described in the context of scenarios in which device 10 is being manipulated by a user's fingers. This is, however, merely illustrative.

A user may desire to open clip 16 or may desire to otherwise manipulate device 10. For clarity, the present invention is sometimes described in the context of users who desire to open clip 16. If desired, however, the unintended pressure on button 14 may arise from a desire to manipulate device 10 in other ways. For example, a user may be picking up device 10, may be opening a cover of device 10, may be placing device 10 into a protective case, may be adjusting the orientation of device 10 on a stand or other support structure, or may be touching device 10 for other reasons. The description of users who unintentionally press against button 14 in device 10 to open clip 16 is merely illustrative.

As the user squeezes fingers 38 and 40 towards each other, finger 40 tends to move in direction 44, thereby pressing end 32 of clip 16 upwards in direction 28. This causes clip 16 to pivot about axis 20, so that end 26 of clip 16 moves in direction 24 from position 17 into the position shown in FIG. 2. At the same time, finger 38 presses downward in direction 42 against the upper portion of device 10. During this operation, finger 38 may press against button 14. Most typically, finger 42 will press against button 14 in region 46 of the upper surface of button 14 (to the left of vertical axis 50 passing through the pivot of hinge 18), rather than in region 48 (to the right of vertical axis 50).

Sensor 36 may be used to detect the presence of finger 38. When, for example, finger 38 touches button 14 in region 46 or when finger 38 approaches close to button 14 (e.g., when finger 38 is less than a millimeter or other suitable distance away from the upper surface of button 14), sensor 36 can detect this event. When sensor 36 detects that the user's finger is present in region 46 (and, if desired, also detects that no finger is present in region 48), control circuitry within device 10 may automatically configure button 14 in real time to adjust the mechanical properties of button 14. For example, one or more solenoids or other actuator equipment may be used to prevent motion of all or part of button 14 relative to housing 12 along axis 50. Once finger 38 is no longer present in region 46, button 14 may be returned to its normal configuration in which travel along direction 50 is permitted. The user may then press against button 14 in region 48 to operate button 14 as needed. If desired, when sensor 36 detects that the user's finger is present in region 46 (and, if desired, also detects that no finger is present in region 48), control circuitry within device 10 may disable the functionality of button 14 (e.g., device 10 may ignore any input received by button 14 when the user's finger is present in region 46).

Figure 3:
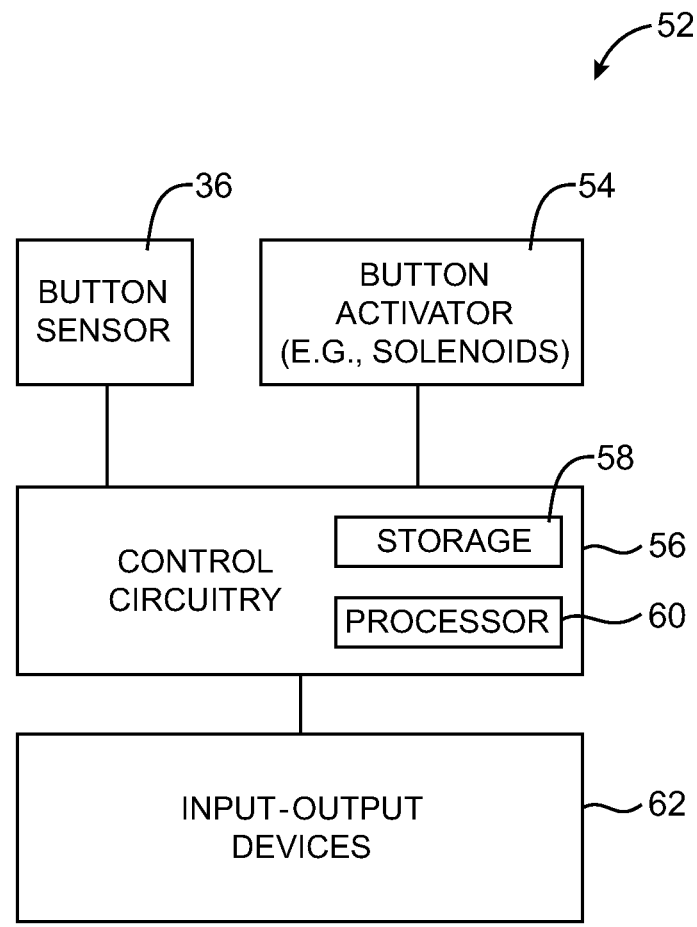
FIG. 3 is a circuit diagram of an illustrative electronic device having a configurable button in accordance with an embodiment of the present invention.

Circuitry 52 in device 10 is shown in FIG. 3. As shown in FIG. 3, circuitry 52 may include control circuitry 56. Control circuitry 56 may include storage 58 and processing circuitry 60. Storage 58 may include one or more different types of storage such as hard disk drive storage, nonvolatile memory (e.g., flash memory or other electrically-programmable-read-only memory), volatile memory (e.g., battery-based static or dynamic random-access-memory), etc. Processing circuitry 60 may be used to control the operation of device 10 (e.g., by running software instructions stored in storage 58). Processing circuitry 60 may be based on a processor such as a microprocessor and other suitable integrated circuits. With one suitable arrangement, processing circuitry 60 and storage 58 are used to run software on device 10 such as media playback software.

Input-output devices 62 may be coupled to control circuitry 56. Devices 62 may be used to allow data to be supplied to device 10 and to allow data to be provided from device 10 to external devices. Examples of input-output devices that may optionally be used in device 10 include displays, light-emitting diodes, buttons, microphones, and speakers. Input-output devices 62 may also include connectors such as audio jacks (e.g., for connecting headphones to device 10), video jacks, universal serial bus connectors, connectors for other digital and analog ports, etc. In larger devices, input-output devices 62 may include displays, touch screens, joysticks, click wheels, scrolling wheels, touch pads, key pads, keyboards, cameras, etc.

Button sensor 36 may be used to detect when a user's fingers or other object is present in the vicinity of button 14 (e.g., in region 46 of FIG. 2). Actuator 54 may be used to control the mechanical properties of button 14 such as the permitted travel of button 14 with respect to case 12 and thereby serves as a controllable mechanism for enabling and disabling button 14. Actuator 54 may include one or more solenoids or other suitable electrically controllable actuator components.

A user can control the operation of circuitry 52 and device 10 by supplying commands through user input devices 62. Control circuitry 56 may also run software that performs actions automatically. For example, control software may be implemented on circuitry 56 that directs circuitry 56 to receive sensor data from button sensor 36 and to control actuator 54 in real time based on the sensor data.

Figure 4:
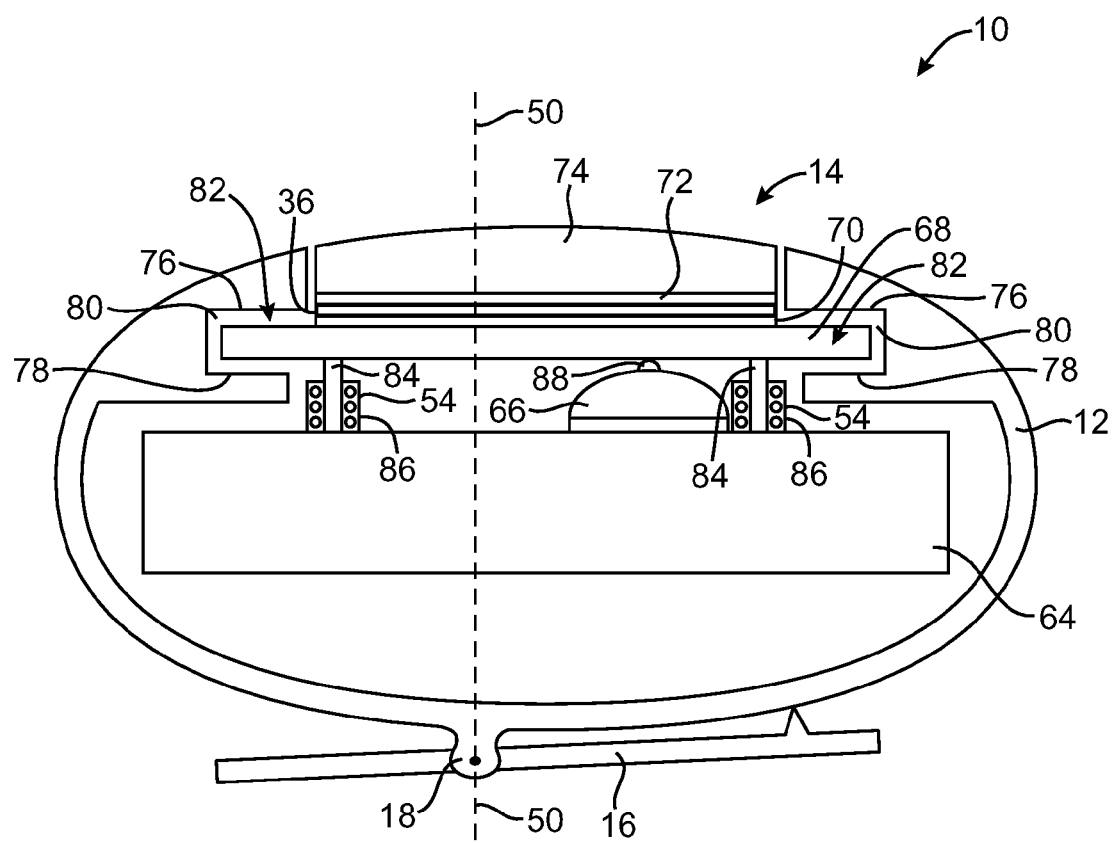
FIG. 4 is a cross-sectional side view of an illustrative portable electronic device with a configurable button in accordance with an embodiment of the present invention.

A cross-sectional view of an illustrative device 10 having a configurable button is shown in FIG. 4. As shown in FIG. 4, button 14 of device 10 may include a button member 74, sensor 36, and button support structure 68. Button member 74 may be formed of glass, plastic, or any other suitable material. One or more structures may be used in forming button member 74. Button member 74 may be attached to sensor 36 using any suitable attachment mechanism. As an example, pressure-sensitive adhesive (e.g., double-sided adhesive-coated tape) such as tape 72 may be used to attach button member 74 to the upper surface of sensor 36. Sensor 36 may also be mounted to support 68 using double-sided adhesive-coated tape such as tape 70.

Support 68 may be formed from plastic, metal, or other suitable materials. Portions 82 of support 68 may protrude into openings in housing 12 such as annular groove 80. When protruding into groove 80, portions 82 may be captured between upper groove surface 76 and lower groove surface 78. This limits the vertical travel of button 14. Support 68 may have tabs, slots, and other features that allow support 68 to accommodate radial expansion and compression during assembly. This allows support 68 to be pressed into groove 80 when mounting support 68 and button 14 into device 10.

Structures 64 may include circuitry such as circuitry 52 of FIG. 3 mounted on one or more rigid and flexible printed circuit boards (e.g., fiberglass-filled epoxy printed circuit boards and flex circuits formed from flexible dielectrics such as polyimide). Structures 64 may also include a battery, mounting structures, internal mechanical structures such as frame structures, etc.

To configure the mechanical properties of button 14 in real time, device 10 may include actuator 54. In the example of FIG. 4, actuator 54 is shown as being formed from solenoids. The solenoids may have at least two states. In a first state, plungers 84 are allowed to reciprocate freely within solenoid bodies 86, thereby allowing button 14 to move freely. In a second state, free movement of plungers 84 is fully or partially inhibited, so that the motion of structure 68 and therefore button 14 is restricted. Depending on the desired configuration for button 14, motion of structure 68 may be completely prevented or structure 68 may be allowed to travel within groove 80 to a lesser extent than would otherwise be possible, thereby modifying the mechanical behavior of button 14. Motion may be restricted by increasing friction (resistance to motion), by establishing hard limits on travel, by using combinations of such arrangements, or by using other suitable technique.

In the FIG. 4 example, two solenoids are shown as bearing against structure 68. This is merely illustrative. One or more actuating devices of any suitable type may be used to adjust the behavior of button 14 based on sensor readings from sensor equipment such as sensor 36. The arrangement of FIG. 4 in which two or more solenoids are used to arrest the motion of button 14 is an example of one suitable arrangement, but other arrangements may be used if desired (e.g., with fewer solenoids, with more solenoids, with actuators of other types, with combinations of different actuators, etc.). The solenoids or other actuating elements may be operated in concert (e.g., so both are in the same state at the same time) or may be operated independently.

A dome switch such as dome switch 66 or other suitable switch element may be operated when button 14 is depressed. Dome switch 66 may have an associated nub 88 that bears against button 14 to provide crisp button operation. Nub 88 may be formed from plastic, epoxy, or any other suitable material. If desired, switch structures that use other types of switches (i.e., non-dome switches) may be used for button 14 if desired. With one suitable arrangement, these switches may allow button 14 to be placed in two different states. When depressed, button 14 is placed into a first state. When released and not depressed, button 14 may be placed in a second state. The first state may represent a closed position and the second state may represent an open position or vice versa. If desired, button 14 may be provided with switch structures that allow the button to be placed in three or more operational states.

Spring action for button 14 may be provided by the spring force of the switch structure (e.g., dome switch 66). Spring action may alternatively or in addition be provided by other spring structures. These springs may, for example, be formed on or under support 68.

Figure 5:
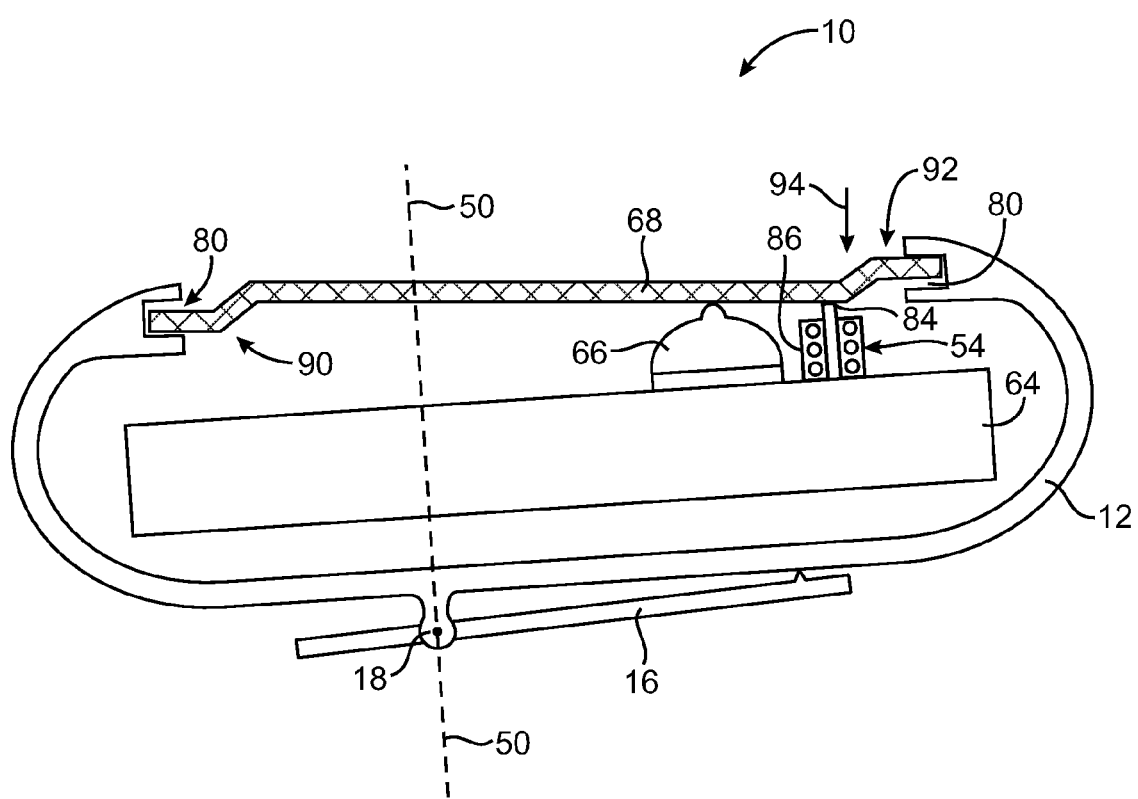
FIG. 5 is cross-sectional side view of an illustrative electronic device of the type shown in FIG. 4 showing an illustrative shape that may be used for a button support structure in accordance with an embodiment of the present invention.

In the illustrative arrangement of device 10 that is shown in FIG. 5, support 68 has bent tabs such as tabs 90 and 92. These tabs may allow for a desired range of motion of button 14. Springs on support 68 (not shown in FIG. 5) may bias support 68 so that the lower surface of tab 90 is registered against the lower surface of groove 80, whereas the upper surface of tab 92 is registered against the upper surface of groove 80. When solenoid 54 is placed into a first state in which free motion of plunger 84 within body 86 is permitted, the button may be depressed to press tab 92 downwards in direction 94, thereby allowing support 68 to activate dome switch. When solenoid 54 is placed into a second state in which free motion of plunger 84 within body 86 is prevented or otherwise restricted, button motion in direction 94 will also be prevented or otherwise restricted. This may make it more difficult or impossible for the button depression to activate dome switch 66.

Figure 6:
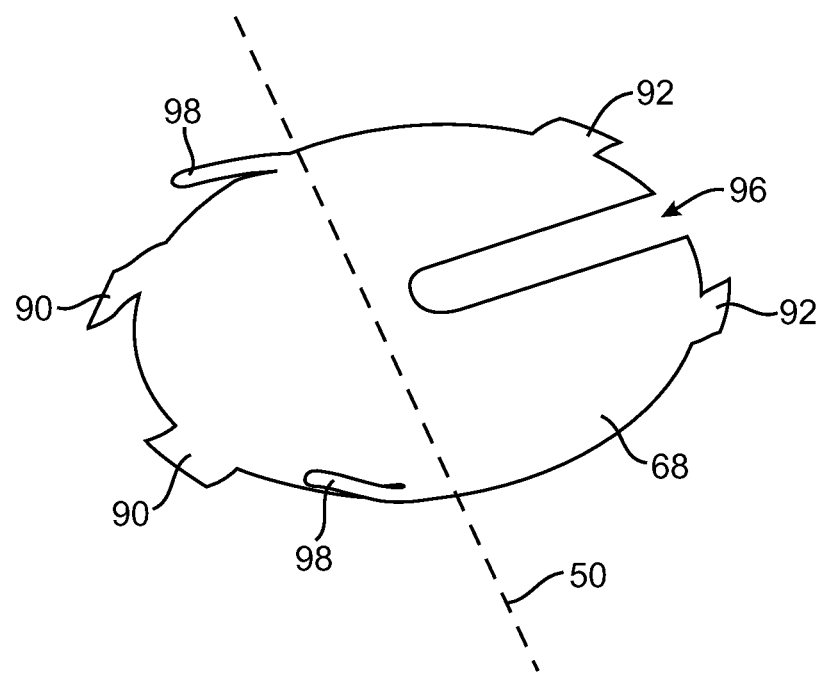
FIG. 6 is a perspective view of an illustrative button support structure of the type shown in cross-section in FIG. 5 in accordance with an embodiment of the present invention.

FIG. 6 shows a perspective view of an illustrative support 68 having two downwardly bent tabs 90 and two upwardly bent tabs 92. One or more features such as slot 96 may allow support 68 to flex so that support 68 may be press fit within groove 80 or other suitable opening in housing 12. When assembled within device 10, springs 98 may bear against the upper surface of groove 80. This biases tabs 90 downwards against the lower surface of groove 80. Dome switch 66 or additional springs formed in support 68 may be used to provide an upward bias in the vicinity of tabs 92, so that the upper surfaces of tabs 92 register against the upper surface of groove 80. A top view of an illustrative support such as support 68 of FIG. 6 is shown in FIG. 7.

Figure 7:
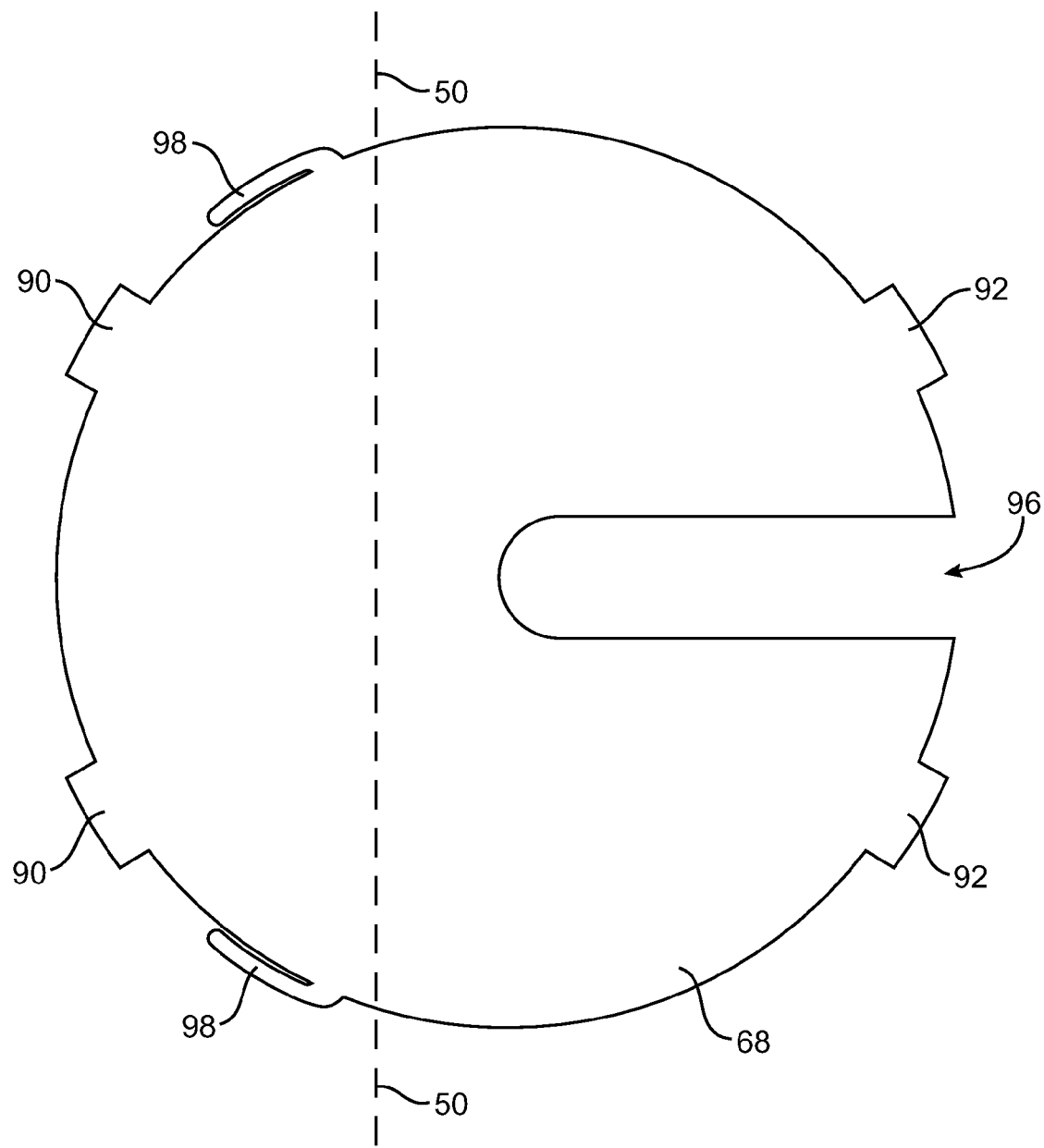
FIG. 7 is a top view of an illustrative button support structure of the type shown in cross-section in FIG. 5 in accordance with an embodiment of the present invention.

In arrangements of the type shown in FIGS. 6 and 7, spring members 98 are formed as an integral portion of support 68. If desired, springs may be attached to support 68 (e.g., using fasteners, welds, adhesive, etc.). Springs 68 may be formed from stainless steel or other suitable resilient material.

Figure 8:
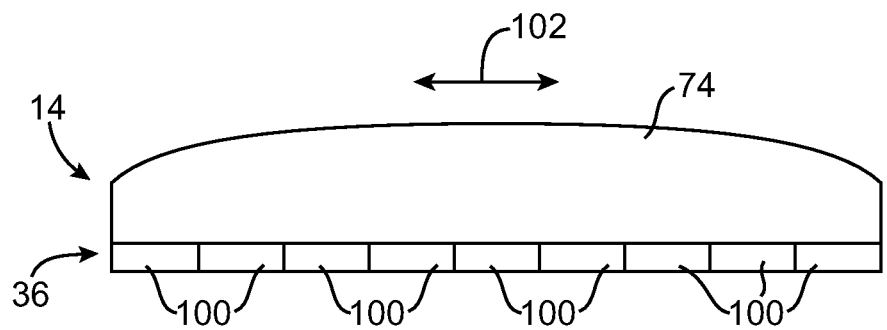
FIG. 8 is a cross-sectional side view of an illustrative button having a touch sensor with multiple segments in accordance with an embodiment of the present invention.

Sensors such as sensor 36 may include any suitable number of sensor segments. An illustrative example in which sensor 36 has nine individual segments is shown in FIG. 8. With this type of arrangement, the presence of a user's finger or other object may be detected with a precision of one part in nine along horizontal dimension 102 on the exposed upper surface of button member 74. If desired, more segments or a two-dimensional array of segments may be used in sensor 36. Each segment may be formed, for example, by a respective conductive (e.g., metal) electrode that detects capacitance changes induced by the close proximity or touch of a user's finger or other object.

If desired, sensors 36 may be implemented with fewer individual elements. As shown in the example of FIG. 9, sensor 36 may have three independent segments 100, each of which may independently be used to produce a sensor signal to indicate the presence of a finger or other object on an adjacent portion of button member 74.

Figure 10:
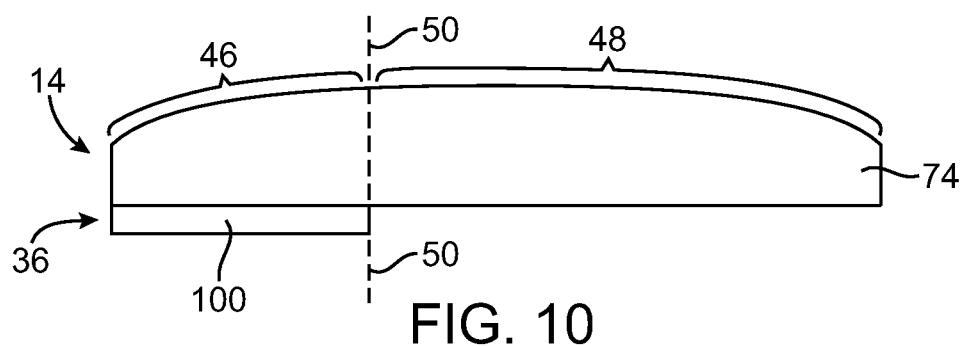
FIG. 10 is a cross-sectional side view of an illustrative button having a single-element touch sensor in accordance with an embodiment of the present invention.

The example of FIG. 10 shows how sensor 36 may have only a single element such as sensor element 100. With this type of arrangement, the element may be placed under region 46, but not under region 48.

With a sensor arrangement of the type shown in FIG. 10, button travel can be restricted whenever the single sensor under region 46 detects the presence of a finger. This allows a user to manipulate structures on device 10 such as opening clips such as clip 16, without inadvertently activating button 14. With a sensor arrangement of the type shown in FIGS. 8 and 9, which offer more sensor element granularity, the control circuitry in the device can determine when the user's finger is touching region 46 of button and is not touching region 48. If desired, button motion can be permitted when the finger is touching both regions 46 and 48, as this may be indicative of an intentional button press operation, whereas button motion can be restricted when the finger is touching only region 46.

Figure 9:
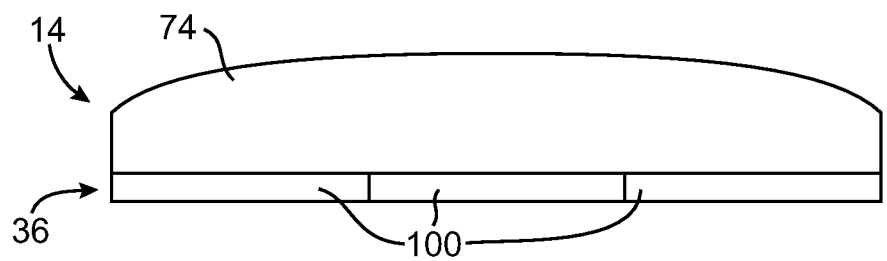
FIG. 9 is a cross-sectional side view of an illustrative button of the type shown in FIG. 8 having a touch sensor with fewer segments in accordance with an embodiment of the present invention.
Figure 11:
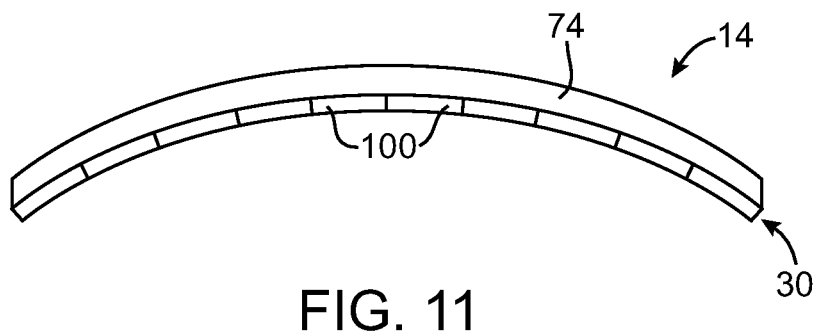
FIG. 11 is a cross-sectional side view of an illustrative button showing how a touch sensor may be mounted along a curved lower portion of the button in accordance with an embodiment of the present invention.

In the examples of FIGS. 8, 9, and 10, button sensor 36 is shown as being formed on a flat lower surface of button member 74. If desired, button member 74 may have a curved lower surface or a lower surface with other suitable shapes, as shown in FIG. 11. In arrangements of this type, an additional button member that serves as a support may be mounted under sensor segments 100.

Figure 12:
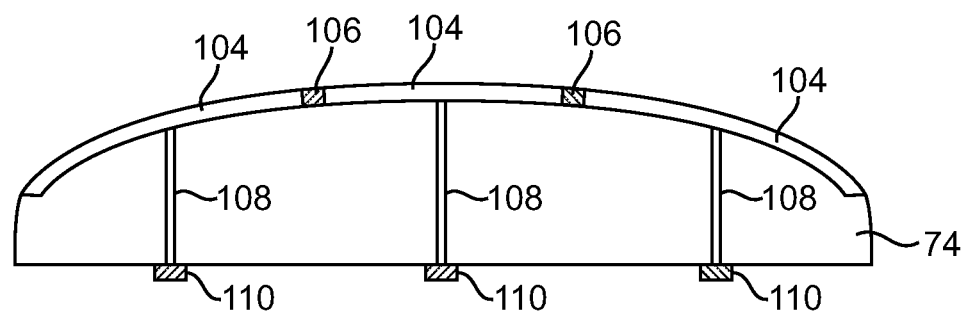
FIG. 12 is a cross-sectional side view of an illustrative button having externally mounted sensor electrodes in accordance with an embodiment of the present invention.

Sensor 36 may, if desired, have exposed electrodes on the exposed upper surface of button member 74. As shown in FIG. 12, exposed surface electrodes 104 may be electrically separated from each other by interposed dielectric regions 106. Electrodes 104 may be formed from metal or other suitable conductive materials. Dielectric regions 106 may be formed from epoxy, polyimide, plastic, or other suitable dielectric materials. Conductive paths such as vias 108 may be used to interconnect electrodes 104 to contact pads 110. Pads 110 may, in turn, be connected to sensor circuitry.

Figure 13:
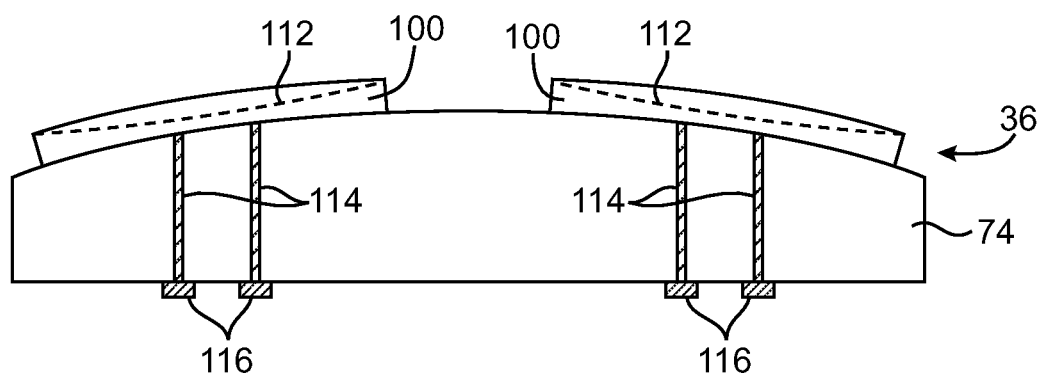
FIG. 13 is a cross-sectional side view of an illustrative button with externally mounted sensor components such as pressure sensor elements in accordance with an embodiment of the present invention.

FIG. 13 shows an illustrative arrangement for sensor 36 in which segments 100 are formed from sensor elements that do not use capacitive sensor technology. Segments 100 may, for example, include pressure-sensitive diaphragms, as shown schematically by dotted lines 112. Segments such as segments 100 may also be implemented using resistive sensor arrangements in which changes in resistance (through contact or pressure) may be measured and used to detect the presence of a user's finger or other object. Conductive paths such as via-based paths 114 and pads 116 may be used to route signals from sensor segments 100 to sensor circuitry.

Figure 14:
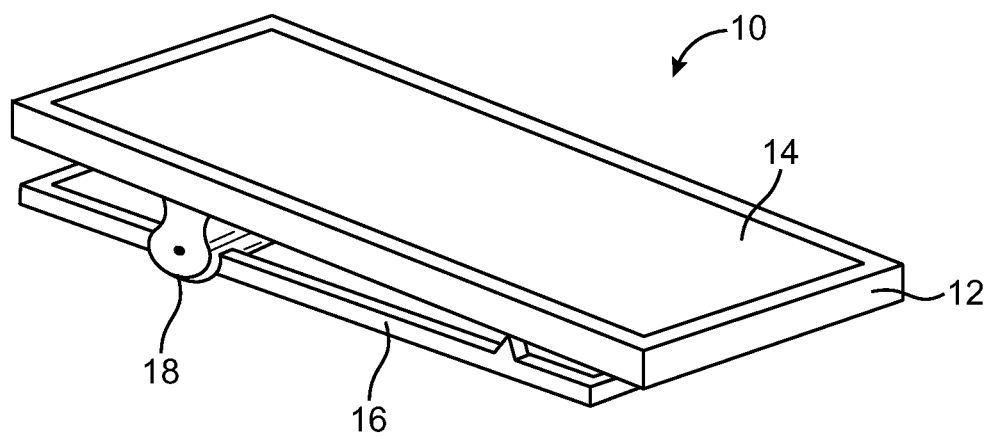
FIG. 14 is a perspective view of an illustrative electronic device having a generally rectangular configurable button in accordance with an embodiment of the present invention.

If desired, device 10 may have shapes other than the roughly circular shape shown in FIG. 1. As an example, device 10 may have a rectangular outline as shown in FIG. 14. With this type of arrangement, configurable button 14 may also have a rectangular outline. Button 14 may, in general, have any suitable shape (e.g., a shape with straight sides, a shape with curved sides, a circular shape, a square, triangular, rectangular, or other polygonal shape, a shape with a mixture of curved and straight portions, a domed shape, a flat-topped shape, etc.).

Figure 15:
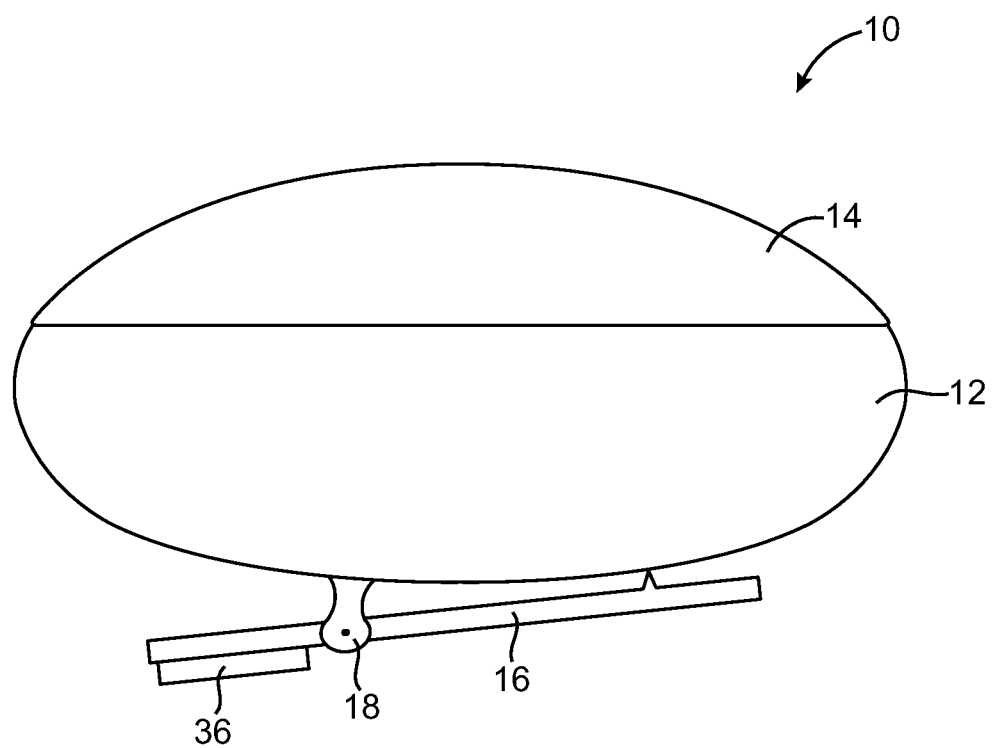
FIG. 15 is a cross-sectional side view of an illustrative electronic device having a sensor for a configurable button that is not mounted directly to the button in accordance with an embodiment of the present invention.

Sensor 36 need not be mounted on button 14. As shown in FIG. 15, for example, sensor 36 may be mounted on clip 16. When a user's finger or other object is present, sensor 36 may inform the control circuitry in device 10 accordingly, so that button 14 may be configured (e.g., by locking the travel of button 14 so long as sensor 36 is being contacted). In the FIG. 15 example, sensor 36 is shown as being mounted on clip 16. If desired, sensor 36 may be located on an exterior portion of housing 12 or other structures associated with device 10. As described in connection with FIGS. 8, 9, and 10, sensors of this type may have any suitable number of segments 100.

If desired, changes in the capacitance of all or part of clip 16 may be sensed by monitoring clip 16 directly, in which case clip 16 serves as a sensor electrode. Case 12, a portion of case 12, or other electrically conductive structures associated with device 10 may also be used as sensor electrodes.

Device 10 may be provided with sensors that are mounted in diverse locations. For example, a first sensor may be mounted on clip 16 as shown in FIG. 15, whereas a second sensor may be mounted on button member 74 as shown in FIG. 4. In this type of configuration, button travel may be restricted only when fingers are detected as being present on both sensors simultaneously (as an example). Arrangements for device 10 of this type may use sensors in any suitable number of locations (e.g., one, two, three, more than three, etc.). Although arrangements with numerous diverse sensors and numerous sensor electrodes may be more complex than arrangements with fewer sensors and sensor segments, the improved accuracy in monitoring a user's interactions with device 10 and button 14 may be warranted in certain applications.

Figure 16:
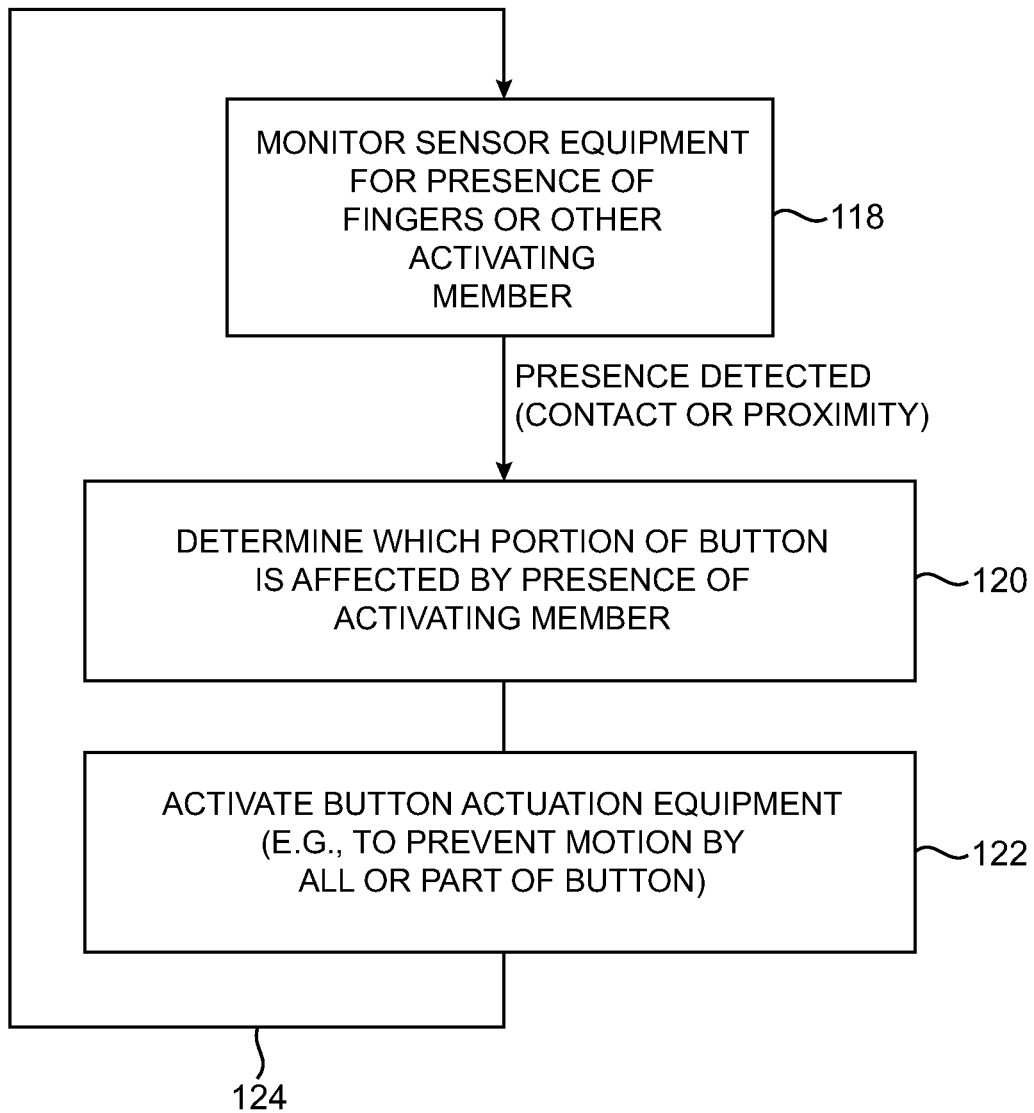
FIG. 16 is a flow chart of illustrative steps involved in using equipment with a configurable button in accordance with an embodiment of the present invention.

Illustrative steps involved in using a device 10 that has one or more configurable buttons such as button 14 are shown in FIG. 16.

At step 118, one or more sensors such as sensor 36 may be monitored to detect the presence of a user's fingers and other objects. With capacitive touch sensor arrangements, the presence of an object such as a user's finger may be detected before the finger actually touches the sensor. This allows device 10 to configure button 14 proactively, as soon as the finger is detected within the vicinity of the sensor. Capacitive touch sensors also generate signals when touched by fingers and other objects. Other sensor arrangements (e.g., sensors based on resistance changes, sensors based on pressure-sensing diaphragms, etc.) may sometimes require actual contact (e.g., a touch by a finger or other object) before a positive sensor reading is generated.

Regardless of the particular type of sensor equipment that is used to detect presence of a finger or other object in the vicinity of device 10, once the presence of the object is detected, processing may proceed to step 120. During the operations of step 120, sensor signals may be analyzed to determine which portion of the button is affected by the presence of the finger or other activating member. For example, it may be determined that the user's fingers are being used to squeeze clip 16 as described in connection with FIG. 2. In devices with other configurations, sensor signals may be used to ascertain when a user is opening a lid, moving a latch, closing a cover, or is otherwise physically manipulating structures associated with device 10 without intending to activate button 14.

At step 122, button 14 may be configured appropriately based on the measured sensor data. If, for example, it is determined that the user is attempting to operate button 14 normally, actuator 54 (e.g., the solenoids shown in FIG. 4) may be directed to allow button 14 to reciprocate freely within housing 12. If, however, it is determined that the user is attempting to manipulate a clip, lid, or other structure associated with device 10 but is not attempting to actuate button 14, the movement of button 14 may be fully or partly restricted using actuator 54.

As shown by line 124, the operations of FIG. 16 may be performed by control circuitry 52 of FIG. 3 continuously while using device 10.

With another suitable arrangement, button 14 may be formed in such as way that the button is not actuated when a user's finger presses against button 14 in region 46 and is actuated when the user's finger presses against button 14 in region 48. For example, button support structure 68 may be configured such that tabs 90 (FIG. 5) rest against lower groove surface 78 of groove 80 creating a pivot axis around which the button support structure pivots. With this type of arrangement, button 14 is not actuated when the user's finger presses against region 46 of button 14 (e.g., because the user's finger presses against a portion of button support structure 68 that is close to the pivot axis of the button support structure, the user's finger may not generate enough force on dome switch 66 to actuate button 14). In contrast, button 14 is actuated when the user's finger presses against region 48 of button 14 (e.g., because the user's finger presses against a portion of structure 68 that is away from the pivot axis, the user's finger generates enough force on switch 66 to actuate button 14).

The foregoing is merely illustrative of the principles of this invention and various modifications can be made by those skilled in the art without departing from the scope and spirit of the invention.

What is claimed is:

1. Apparatus, comprising:
    a button member;
    a sensor that detects when an object is present;
    an actuator that controls movement of the button member; and
    control circuitry that directs the actuator to prevent movement of the button member when the sensor detects that the object is in contact with a predefined portion of the button member.

2. The apparatus defined in claim 1 further comprising a portable electronic device housing in which the button member is mounted.

3. The apparatus defined in claim 2 further comprising:
    a button support structure to which the button member is connected, wherein the housing comprises portions that define a groove in which the button support structure is mounted.

4. The apparatus defined in claim 1 further comprising:
    a button support to which the button member is mounted;
    a portable electronic device housing in which the button support is mounted; and
    a switch that is activated when the button reciprocates relative to the portable electronic device housing, wherein the apparatus comprises a button that includes the button member, the button support, and the sensor.

5. The apparatus defined in claim 4 wherein at least part of the sensor is mounted between the button member and the button support.

6. The apparatus defined in claim 5 wherein the button support comprises metal.

7. A method for configuring a button, comprising:
- with control circuitry in an electronic device, using a sensor associated with the button to detect whether an object is in contact only with a predefined portion of the button; and
- when the object is in contact only with the predefined portion of the button, using the control circuitry to direct an actuator to prevent motion of the button.

8. The method defined in claim 7 wherein the button comprises a button support mounted within a portable electronic device housing, and further comprising using the control circuitry to direct the actuator to prevent motion of the button relative to the portable electronic device housing when the object is in contact with the pre-defined portion of the button.

9. A configurable button for an electronic device, comprising:
- at least one button member;
- at least one touch sensor that detects when the button member is touched; and
- an actuator that prevents movement of the button member relative to the electronic device when a predefined portion of the button member is being touched.

10. The configurable button defined in claim 9 wherein the button member comprises glass and wherein the at least one touch sensor comprises a capacitive touch sensor.

11. The configurable button defined in claim 9 wherein the touch sensor is mounted under a the predefined portion of the button member.

12. The configurable button defined in claim 9 further comprising a button support, wherein at least part of the touch sensor is mounted on the button support and wherein the button member is mounted on at least part of the touch sensor.

* * * * *